United States Patent
Watanabe et al.

(10) Patent No.: US 10,935,425 B2
(45) Date of Patent: Mar. 2, 2021

(54) SPECTROSCOPIC DETECTOR

(71) Applicant: SHIMADZU CORPORATION, Kyoto (JP)

(72) Inventors: Masato Watanabe, Kyoto (JP); Takuya Yonekura, Kyoto (JP); Hiroyuki Togo, Kyoto (JP); Shinji Tsuji, Kyoto (JP); Yugo Ishihara, Kyoto (JP); Atsushi Sakamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/626,404

(22) PCT Filed: Jul. 18, 2017

(86) PCT No.: PCT/JP2017/025845
§ 371 (c)(1),
(2) Date: Dec. 24, 2019

(87) PCT Pub. No.: WO2019/016846
PCT Pub. Date: Jan. 24, 2019

(65) Prior Publication Data
US 2020/0116566 A1    Apr. 16, 2020

(51) Int. Cl.
*G01J 3/10* (2006.01)
*G01J 3/02* (2006.01)
*G01J 3/28* (2006.01)

(52) U.S. Cl.
CPC .............. *G01J 3/10* (2013.01); *G01J 3/0286* (2013.01); *G01J 3/28* (2013.01)

(58) Field of Classification Search
CPC .............. G01J 3/10; G01J 3/0286; G01J 3/28
(Continued)

(56) References Cited

U.S. PATENT DOCUMENTS 6,181,070 B1 * 1/2001 Dunn ............... F21V 29/02
                                                    315/112
2005/0063186 A1    3/2005 Oda
(Continued)

FOREIGN PATENT DOCUMENTS

JP    2000-074821 A    3/2000
JP    2005-098765 A    4/2005
(Continued)

OTHER PUBLICATIONS

International Search Report for corresponding Application No. PCT/JP2017/025845, dated Oct. 10, 2017.
(Continued)

*Primary Examiner* — Tarifur R Chowdhury
*Assistant Examiner* — Omar H Nixon
(74) *Attorney, Agent, or Firm* — Renner, Otto, Boisselle & Sklar, LLP

(57) ABSTRACT

A spectroscopic detector includes a lamp house, a sample cell, an optical sensor, a heater, a cooling fan, a temperature sensor, and a control device. The heater heats the lamp house while being directly or indirectly in contact with the lamp house containing a light source. The cooling fan is for cooling the lamp house. The temperature sensor is for detecting a temperature of the lamp house. The control device is configured to control operations of the light source, the heater, and the cooling fan. The control device includes a temperature control part configured to maintain a temperature of the lamp house while the light source is lit at a set temperature by controlling at least output of the heater based on a detection signal of the temperature sensor.

6 Claims, 2 Drawing Sheets

(58) Field of Classification Search
USPC .......................................................... 356/328
See application file for complete search history.

(56) References Cited

U.S. PATENT DOCUMENTS

| | | | |
|---|---|---|---|
| 2008/0007953 A1* | 1/2008 | Keller | H01L 33/641 |
| | | | 362/294 |
| 2011/0225090 A1* | 9/2011 | Hammad | G06Q 20/405 |
| | | | 705/44 |
| 2014/0063496 A1 | 3/2014 | Owa | |
| 2014/0092383 A1 | 4/2014 | Gunji | |
| 2014/0291557 A1 | 10/2014 | Harbers | |
| 2016/0305640 A1* | 10/2016 | Brown | F21V 29/74 |

FOREIGN PATENT DOCUMENTS

| | | |
|---|---|---|
| JP | 2011-002310 A | 1/2011 |
| JP | 2014-048176 A | 3/2014 |
| JP | 2015-503108 A | 1/2015 |
| WO | 2012-176851 A1 | 12/2012 |

OTHER PUBLICATIONS

Written Opinion for corresponding Application No. PCT/JP2017/025845, dated Oct. 10, 2017.
Office Action for corresponding JP Application No. 2019-530254, dated Sep. 1, 2020, with English language translation.

* cited by examiner

SPECTROSCOPIC DETECTOR

TECHNICAL FIELD

The present invention relates to a detector including a spectroscope in an optical system that guides light from a light source to a sample cell and guides light from the sample cell to an optical sensor, such as a spectrophotometer and a differential refractive index detector (hereinafter, such a detector will be referred to as a "spectral detector").

BACKGROUND ART

Spectral detectors, such as an ultraviolet and visible spectrophotometer, a spectrophotofluorometer, a differential refractive index detector, and the like, use a lamp that emits light with heat generation, such as a deuterium lamp, a halogen lamp, and the like, as a light source. In a spectroscopic detector, a light source is stored in a light source storage component called a lamp house, and an optical system including a spectroscope that guides light to a sample cell or an optical sensor is contained in a storage component that is separate from the lamp house (see Patent Document 1).

Light emitted from the light source is dispersed by the spectroscope and detected by the optical sensor. A sample cell is disposed on an optical path of light introduced into an optical system housing part, and light that passes through a sample component flowing in the sample cell and fluorescence emitted from the sample component are detected by the optical sensor, so that absorbance and fluorescence intensity of the sample component are measured, based on which the sample component is identified and quantified.

In recent years, generalization of detectors has progressed, and detectors are required to have performance that supports use in various environments. In particular, there is a high demand with respect to an environmental temperature, and a stable baseline is expected to be maintained even in a case where an environmental temperature change of several degrees Celsius occurs, so that high reproducibility is obtained in a measurement result.

However, a light emitting amount of a light source, such as a deuterium lamp or a halogen lamp, has temperature dependence. For example, a light emitting amount of a deuterium lamp changes by about 1% when the environmental temperature (lamp house temperature) changes by 10° C. This amount of change is about 4 mAU in terms of absorbance. This means that when the environmental temperature (lamp house temperature) changes by 1° C., the baseline fluctuates by about 400 µAU.

In view of the above, controlling the temperature of the light source to be constant is proposed so that the temperature of the light source does not fluctuate depending on the environmental temperature (see Patent Documents 2, 3, and 4).

PRIOR ART DOCUMENTS

Patent Documents

Patent Document 1: Japanese Patent Laid-open Publication No. 2014-048176
Patent Document 2: Japanese Patent Laid-open Publication No. 2000-074821
Patent Document 3: Japanese Patent Laid-open Publication No. 2005-098765
Patent Document 4: Japanese Patent Laid-open Publication No. 2011-002310

SUMMARY OF THE INVENTION

Problems to be Solved by the Invention

Since the lamp used as the light source emits light with heat generation, the apparatus is provided with a cooling fan for releasing the heat generated by the light source. The techniques disclosed in Patent Documents 2 to 4 above all maintain the temperature of the light source at a constant temperature by adjusting the rotational speed of the cooling fan.

However, in the temperature control of the light source using the cooling fan, there is a problem of responsiveness that a long time is required until the temperature of the light source changes due to the change in the rotational speed of the cooling fan. For this reason, in a case where the environmental temperature fluctuates rapidly, there is a problem that the temperature of the light source fluctuates due to the influence of the rapid fluctuation in the environmental temperature.

Further, there is a limit to a range of the temperature control of the light source based on the rotational speed of the cooling fan, and the temperature of the light source cannot be effectively controlled, particularly in a low rotational speed region of the cooling fan.

The present invention has been made in view of the above problems, and an object of the present invention is to allow the temperature of a light source to be controlled with higher accuracy than that in the prior art in a spectroscopic detector, such as a spectrophotometer.

Solutions to the Problems

A spectroscopic detector according to the present invention includes a lamp house, a sample cell, an optical sensor, a heater, a cooling fan, a temperature sensor, and a control device. The lamp house accommodates a light source therein. The sample cell is a cell through which a sample flows therein, and is disposed on an optical path of light radiated by the light source and emitted from the lamp house. The optical sensor is for detecting light from the sample cell. Light from the sample cell includes light that passes through the sample cell, light reflected by the sample flowing through the sample cell, fluorescence emitted from the sample flowing through the sample cell, or the like. The heater heats the lamp house while being directly or indirectly in contact with the lamp house. That "the heater is indirectly in contact with the lamp house" means that the heat from the heater is configured to be transferred to the lamp house through a thermally conductive substance. The cooling fan is for cooling the lamp house. The temperature sensor is for detecting a temperature of the lamp house. The control device is configured to control operations of the light source, the heater, and the cooling fan. The control device includes a temperature control part configured to maintain a temperature of the lamp house while the light source is lit at a preset temperature (hereinafter referred to as the set temperature) by controlling at least output of the heater based on a detection signal of the temperature sensor.

In the spectroscopic detector according to the present invention, temperature control of the lamp house, that is, temperature control of the light source is performed using the heater and the cooling fan. In the field of performing temperature control of an article, combining a heater and a cooling fan is not a special technique. However, in a case where an element that generates heat, such as a light source, is a target of temperature control, as in Patent Documents 2 to 4, an amount of heat released from the light source is generally controlled using the cooling fan.

The present inventors have found that the conventional method using only a cooling fan cannot control the temperature of a light source with high accuracy due to problems, such as responsiveness. In view of the above, the present inventors have come up with the idea of controlling the temperature of the light source by further applying heat to the lamp house containing the light source, which is a heat generating element, and controlling the amount of heating by the heater. Temperature control by applying heat to a heat generating element, such as a light source, by a heater is not generally performed.

When heat is applied to the lamp house by the heater, the temperature raising rate of the lamp house is increased. In this manner, when the temperature of the lamp house is lower than the preset temperature, the lamp house temperature quickly rises to the set temperature by heat generated by the light source and heating by the heater. In this manner, the responsiveness at the time of raising the temperature of the lamp house improves.

Further, by using the heater and the cooling fan in combination, the temperature of the lamp house can be stabilized at a higher temperature than before. The higher the temperature of the lamp house compared to the environmental temperature, the more the heat dissipation efficiency from the lamp house improves. Therefore, by lowering or turning off the output of the heater when the temperature of the lamp house is higher than the set temperature, the temperature of the lamp house is quickly lowered to the set temperature. In this manner, the responsiveness when the temperature of the lamp house is lowered also improves.

The temperature control part may be configured to control output of the heater based on output of the temperature sensor while maintaining the rotational speed of the cooling fan constant.

As described above, since a light emitting amount of the light source has temperature dependence, the light emitting amount of the light source is not stable until the temperature of the light source is stabilized after the light source is lit. For this reason, it is necessary to wait without starting the measurement until the temperature of the light source is stabilized after the light source is lit. Patent Document 2 proposes to increase the temperature rising rate of the lamp house after the light source is lit so that the temperature of the lamp house reaches a predetermined temperature within a short period of time by stopping the cooling fan or controlling the rotational speed to be smaller than that at the normal time until the temperature of the lamp house reaches the predetermined temperature after the light source is lit. In this manner, the time from when the light source is lit until the temperature of the light source is stabilized is shortened, and the measurement can be started earlier, so that the analysis efficiency is improved.

Since the spectroscopic detector according to the present invention includes a configuration in which the lamp house is heated by the heater, the temperature of the lamp house can be raised at a higher speed than in the prior art. In view of the above, in the spectroscopic detector according to the present invention, the control device preferably further includes a high-speed stabilization part configured to raise a temperature of the lamp house to the preset temperature or a temperature in the vicinity of the preset temperature by heating the lamp house using the heater before the light source is lit or substantially at the same time as the light source is lit. In this manner, the time from when the light source is lit until the temperature of the lamp house reaches the set temperature is shortened, so that the waiting time until the temperature of the light source stabilizes can be further shortened, and improvement in the analysis efficiency can be achieved.

In the above case, the high-speed stabilization part is preferably configured to raise a temperature of the lamp house to the preset temperature or a temperature in the vicinity of the preset temperature while stopping the cooling fan. In this manner, the temperature raising rate of the lamp house will be further increased, and the time until the temperature of the light source reaches the set temperature is further shortened.

Effects of the Invention

The spectroscopic detector according to the present invention is configured to maintain the temperature of the lamp house accommodating the light source therein at the set temperature by using the heater and the cooling fan. Accordingly, the responsiveness of the temperature control is improved as compared to a conventional system using only a cooling fan, and the temperature control of the light source can be performed with higher accuracy than the conventional system.

EMBODIMENTS OF THE INVENTION

Hereinafter, a spectrophotometer as an example of a spectroscopic detector of the present invention will be described with reference to the drawings.

Figure 1:
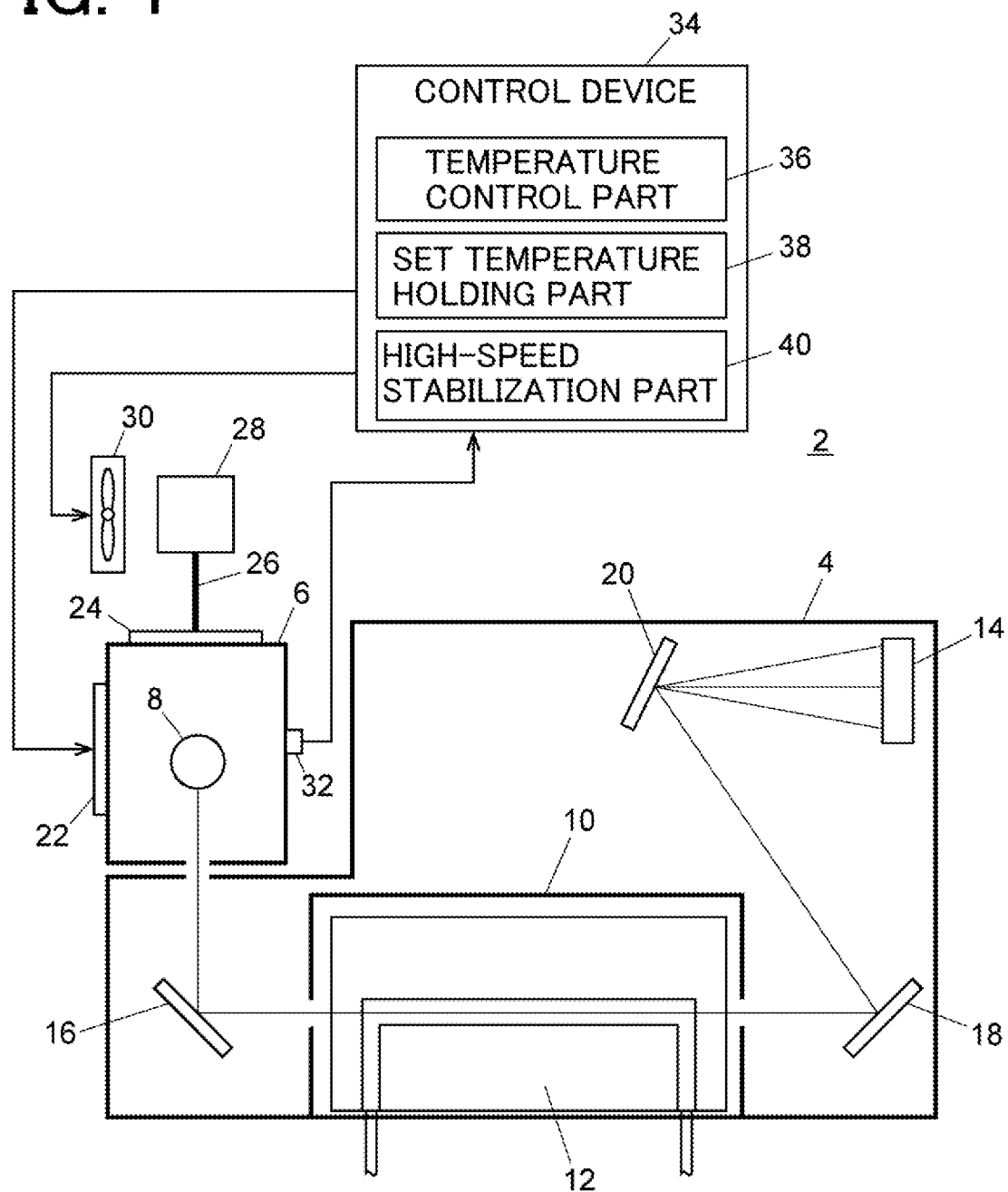
FIG. 1 is a configuration diagram showing a configuration of an embodiment of a spectrophotometer which is an example of a spectroscopic detector.

As shown in FIG. 1, a spectrophotometer 2 of the present embodiment includes an optical system housing part 4 and a lamp house 6. The lamp house 6 is made from a metal, such as aluminum. A light source 8 is accommodated inside the lamp house 6. In the optical system housing part 4, a sample cell 12, an optical sensor 14, mirrors 16 and 18, and a spectroscope 20 are housed.

Note that, in FIG. 1, the optical system housing part 4 and the lamp house 6 are depicted as being independent of each other. However, the optical system housing part 4 and the lamp house 6 may be connected to each other to constitute an integral housing.

The optical system housing part 4 and the lamp house 6 have surfaces facing each other, and windows for allowing light from the light source 8 to pass through are provided on the surfaces facing each other. The light source 8 is a deuterium lamp or a halogen lamp.

A sample cell installation part 10 is provided in the optical system housing part 4, and the sample cell 12 is disposed in the sample cell installation part 10. In the optical system housing part 4, the mirror 16 for reflecting the light taken in from the window on the surface facing the lamp house 6 is disposed so that the light from the light source 8 is reflected and guided to the sample cell 12. The mirror 18 is disposed on an optical path of light that passes through the sample cell 12, and a spectroscope 20, such as a diffraction grating, is disposed on an optical path of light reflected by the mirror 18. Light incident on the spectroscope 20 is dispersed by wavelength regions. The optical sensor 14 including a photodiode array is disposed at a position for receiving light in each wavelength region that is dispersed by the spectroscope 20.

Light emitted from the light source 8 is reflected by the mirror 16 and applied to the sample cell 12. Light that passes through the sample cell 12 is reflected by the mirror 18 and guided to the diffraction grating 20, and the intensity of the light in each wavelength region dispersed by the diffraction grating 20 is detected by the optical sensor 14. By detecting the intensity of light in each wavelength range obtained by the optical sensor 14, an absorption wavelength and absorbance of a sample component flowing through the sample cell 12 are measured, and the sample component is identified and quantified.

The temperature of the lamp house 6 is controlled to a preset temperature by a heater 22 and a cooling fan 30. A temperature sensor 32 is attached to the lamp house 6, and the temperature of the lamp house 6 is detected by the temperature sensor 32. The temperature sensor 32 is realized by, for example, a thermocouple. A detection signal obtained by the temperature sensor 32 is taken into a control device 34 to be described later.

The heater 22 is, for example, a heater on a flat plate, and is bonded to an outer surface of the lamp house 6 with a heat conductive adhesive. Further, the heater 22 may be a ribbon heater wound around an outer surface of the lamp house 6.

The cooling fan 30 is provided so as to blow cooling air against a radiating fins 28. The radiating fin 28 is thermally connected to a heat transfer member 24 attached so as to be in close contact with the outer surface of the lamp house 6 via a heat pipe 26. The heat transfer member 24 is a member made from a metal material (for example, copper) having good thermal conductivity. In this manner, heat of the lamp house 6 is transferred to the heat transfer member 24, and heat of the heat transfer member 24 is transferred to the radiating fin 28 via the heat pipe 26. By blowing cooling air from the cooling fan 30 to the radiating fin 28, heat is absorbed from the lamp house 6 and the lamp house 6 can be cooled.

Note that, in the present embodiment, the heat of the lamp house 6 is transported to a position away from the lamp house 6 by the heat pipe 26 to dissipate heat. However, the present invention is not limited to this, and the cooling air from the cooling fan 30 may be blown directly against the lamp house 6.

Operation of the heater 22 and the cooling fan 30 is controlled by the control device 34. The control device 34 is realized by, for example, a circuit board on which an arithmetic element such as a microcomputer is mounted. The control device 34 includes a temperature control part 36, a set temperature holding part 38, and a high-speed stabilization part 40. The temperature control part 36 and the high-speed stabilization part 40 are functions obtained when an arithmetic element of the control device 34 executes a predetermined program. The set temperature holding part 38 is a function realized by a partial area of the storage device provided in the control device 34.

Based on the detection signal obtained by the temperature sensor 32, the temperature control part 36 is configured to control at least output of the heater 22 so that the temperature of the lamp house 6 while the light source 8 is lit becomes a preset temperature (set temperature).

The rotational speed of the cooling fan 30 may be kept constant. When the rotational speed of the cooling fan 30 is kept constant, the temperature control part 36 feedback-controls the output of the heater 22 based on the detection signal obtained by the temperature sensor 32. In this case, the control target is only the output of the heater 22, and complicated control is unnecessary.

On the other hand, the rotational speed of the cooling fan 30 may be changed as needed. In a case where the rotational speed of the cooling fan 30 is also controlled, for example, the output of the heater 22 is lowered to increase the rotational speed of the cooling fan 30 when the temperature of the lamp house 6 is higher than the set temperature, and in contrast, the output of the heater 22 is lowered to increase the rotational speed of the cooling fan 30 when the temperature of the lamp house 6 is lower than the set temperature.

Further, in order to widen a range in which the temperature can be controlled, the cooling fan 30 can also be used supplementarily. If the rotational speed of the cooling fan 30 is set to a high state, temperature control can be performed in a relatively low temperature range, and if the rotational speed of the cooling fan 30 is set to a low state, temperature control in a relatively high temperature range can be performed.

A temperature (set temperature) of the lamp house 6 to be maintained while the light source 8 is lit is held in the set temperature holding part 38. The set temperature may be optionally changed by the user according to the environmental temperature or the like, or may be a fixed value defined in advance.

Since the spectrophotometer 2 of the present embodiment has a configuration in which the lamp house 6 is heated by the heater 22, the set temperature of the lamp house 6 to be maintained while the light source 8 is lit can be set to be significantly higher than the environmental temperature (room temperature) (for example, the environmental temperature +20° C.). If the set temperature is set to such a high temperature, a temperature difference between the temperature of the lamp house 6 and the environmental temperature while the light source 8 is lit becomes large, so that the heat dissipation efficiency from the lamp house 6 is improved. In this manner, in addition to increase in the temperature raising rate of the lamp house 6 by the heater 22, increase in the temperature lowering speed of the lamp house 6 can also be achieved. Accordingly, the responsiveness of the temperature control of the lamp house 6 and consequently the light source 8 is improved.

In a conventional detector that does not include the heater 22, an element that raises the temperature of the lamp house 6 is only the heat generated by the light source 8. Therefore, a considerable time is required for the temperature of the lamp house 6 to reach such a high temperature, and a long time is required for the temperature of the lamp house 6 to be stable after the light source 8 is lit. For this reason, it is not practical to set the set temperature to such a high temperature in the conventional detector.

The high-speed stabilization part 40 is configured to heat the lamp house 6 with the heater 22 when the spectrophotometer 2 is started up, and to quickly raise the temperature of the lamp house 6 to the set temperature or a temperature in the vicinity of the set temperature. If the temperature of the lamp house 6 quickly reaches the set temperature after the spectrophotometer 2 is started up, the time until the light emitting amount of the light source 8 is stabilized is shortened accordingly, and the standby time until the start of measurement is shortened. The timing at which the lamp house 6 starts to be heated by the heater 22 may be before the light source 8 is lit, or may be at substantially the same time as the light source 8 is lit. The expression "at substantially the same time" includes a timing at which a certain time (for example, within one minute) elapses after the light source 8 is lit.

Note that the high-speed stabilization part 40 is not an essential constituent.

Figure 2:
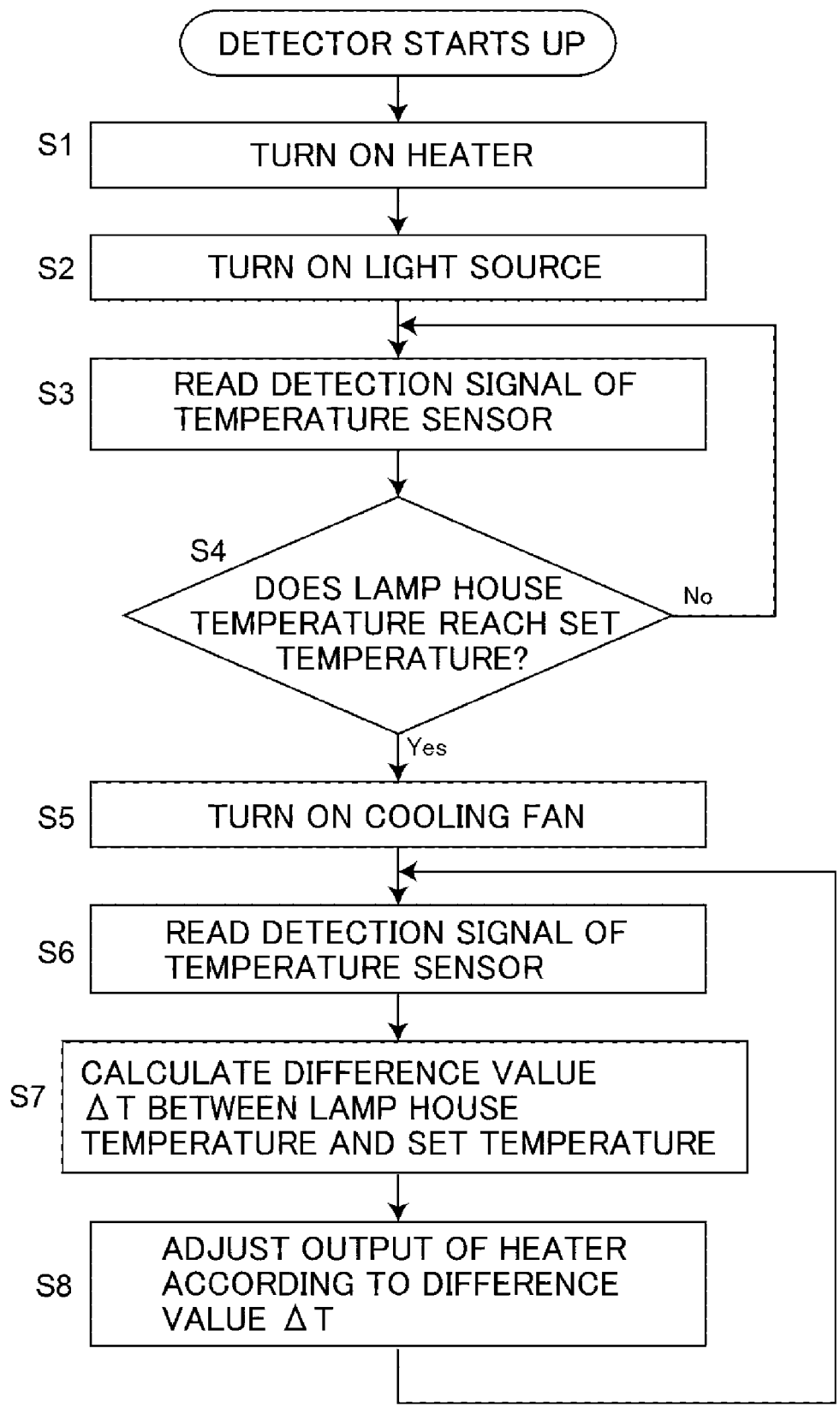
FIG. 2 is a flowchart for explaining an example of operation of temperature control of a lamp house in the embodiment.

An example of the operation of the temperature control of the lamp house 6 after the spectrophotometer 2 is started up in the present embodiment will be described with reference to the flowchart of FIG. 2 together with FIG. 1. Note that, in this example, after the light source 8 is lit, the cooling fan 30 is driven at a constant rotational speed, and the output of the heater 22 is feedback-controlled based on a detection signal of the temperature sensor 32.

When the spectrophotometer 2 (detector) is started up, the high-speed stabilization part 40 turns on the heater 22 and quickly raises the temperature of the lamp house 6 (Step S1). Further, the light source 8 is lit (Step S2). As described above, the timing at which the heater 22 is turned on may be before the light source 8 is lit, or may be substantially at the same time as the light source 8 is lit.

After the heating of the lamp house 6 by the heater 22 is started, the high-speed stabilization part 40 reads the detection signal of the temperature sensor 32 at regular time intervals (Step S3), and whether or not the temperature of the lamp house 6 reaches the set temperature is checked every time (Step S4). When the temperature of the lamp house 6 reaches the set temperature, feedback control of the heater 22 by the temperature control part 36 is started.

The temperature control part 36 turns on the cooling fan 30 and drives the cooling fan 30 at a constant rotational speed (Step S5). After the above, the temperature control part 36 reads the detection signal of the temperature sensor 32 at regular time intervals (Step S6), each time obtains a difference value ΔT between the temperature of the lamp house and the set temperature (Step S7), and supplies power corresponding to the difference value ΔT to the heater 22 to control the output of the heater 22 (Step S8).

The above embodiment describes a spectrophotometer of a post-spectral system as the spectral detector. However, the spectral detector of the present invention is not limited to this, and the present invention can be applied to any detector, as long as the detector includes a spectroscope in an optical system, such as a spectrophotometer of a pre-spectral system or a differential refractive index detector.

DESCRIPTION OF REFERENCE SIGNS

2: Spectrophotometer
4: Optical system housing part
6: Lamp house
8: Light source
10: Sample cell installation part
12: Sample cell
14: Optical sensor
16, 18: Mirror
20: Spectroscope
22: Heater
24: Heat transfer member
26: Heat pipe
28: Radiation fin
30: Cooling fan
32: Temperature sensor
34: Control device
36: Temperature control part
38: Set temperature holding part
40: High-speed stabilization part

The invention claimed is:

1. A spectroscopic detector comprising:
   a light source,
   a lamp house accommodating the light source therein;
   a sample cell, through which a sample flows therein, disposed on an optical path of light radiated by the light source and emitted from the lamp house;
   an optical sensor for detecting light from the sample cell;
   a heater for heating the lamp house while being in direct or indirect contact with the lamp house;
   a cooling fan for cooling the lamp house;
   a temperature sensor that is attached on the lamp house and detects a temperature of the lamp house; and
   a control device configured to control operations of the light source, the heater, and the cooling fan, wherein the control device is configured to maintain a temperature of the lamp house while the light source is lit at a preset temperature by controlling at least output of the heater based on a detection signal of the temperature sensor.

2. The spectroscopic detector according to claim 1, wherein
   the control device is configured to control output of the heater based on output of the temperature sensor while maintaining rotational speed of the cooling fan constant.

3. The spectroscopic detector according to claim 1, wherein
   the control device further is configured to raise a temperature of the lamp house to the preset temperature or a temperature in the vicinity of the preset temperature by heating the lamp house using the heater before the light source is lit or substantially at the same time as the light source is lit.

4. The spectroscopic detector according to claim 3, wherein
   the control device is configured to raise a temperature of the lamp house to the preset temperature or a temperature in the vicinity of the preset temperature while stopping the cooling fan.

5. The spectroscopic detector according to claim 1, wherein
   the preset temperature is higher than environmental temperature.

6. The spectroscopic detector according to claim 1, wherein
   the heater is bonded to an outer surface of the lamp house with a heat conductive adhesive.

* * * * *